United States Patent [19]

Reale

[11] 4,281,026
[45] Jul. 28, 1981

[54] PREPARING FRUIT JUICE POWDER

[76] Inventor: Lucio Reale, 1827 - 46th St., SE, Calgary, Alberta, Canada, T2B 2J9

[21] Appl. No.: 52,231

[22] Filed: Jun. 26, 1979

[51] Int. Cl.³ .............................................. A23L 2/10
[52] U.S. Cl. .................................. 426/599; 159/13 C; 159/34; 426/471
[58] Field of Search ............... 426/615, 658, 599, 577, 426/96, 471, 591, 590; 159/7, 13 R, 34, 36, 13 B, 13 C, 8; 203/12; 202/235, 236, 238; 99/348; 156/622

[56] References Cited

U.S. PATENT DOCUMENTS

| 1,594,804 | 8/1926 | Welch | 426/599 |
| 2,400,460 | 5/1946 | Hall | 426/590 |
| 2,567,038 | 9/1951 | Stevens et al. | 426/599 |
| 2,806,796 | 9/1957 | Dorsey | 426/599 |

*Primary Examiner*—Joseph M. Golian
*Assistant Examiner*—George C. Yeung

*Attorney, Agent, or Firm*—Smyth, Pavitt, Siegemund & Martella

[57] ABSTRACT

A process for producing a fruit preparation from a natural fruit juice, the process comprises removing water from the juice by flowing the juice on a heated, reciprocable, inclinable surface to reduce the water content to 10 to 25% by volume. A crystalline modifying agent is then added to the product. The modifying agent and the product are then blended while heating them. The heating and blending is continued until the water content of the product is in the range of 1 to 15% by volume. An apparatus for producing the preparation is described. The apparatus has a concentrator pivotably mounted at about its center. An end of the vessel can be raised and lowered to reciprocate the vessel about the pivotable mount. The vessel is heated and has a closable outlet at each end. Extractors for vapor produced from the fruit juice heated in the first vessel are provided and blender means to blend the material produced on the concentrator with an added material.

8 Claims, 8 Drawing Figures

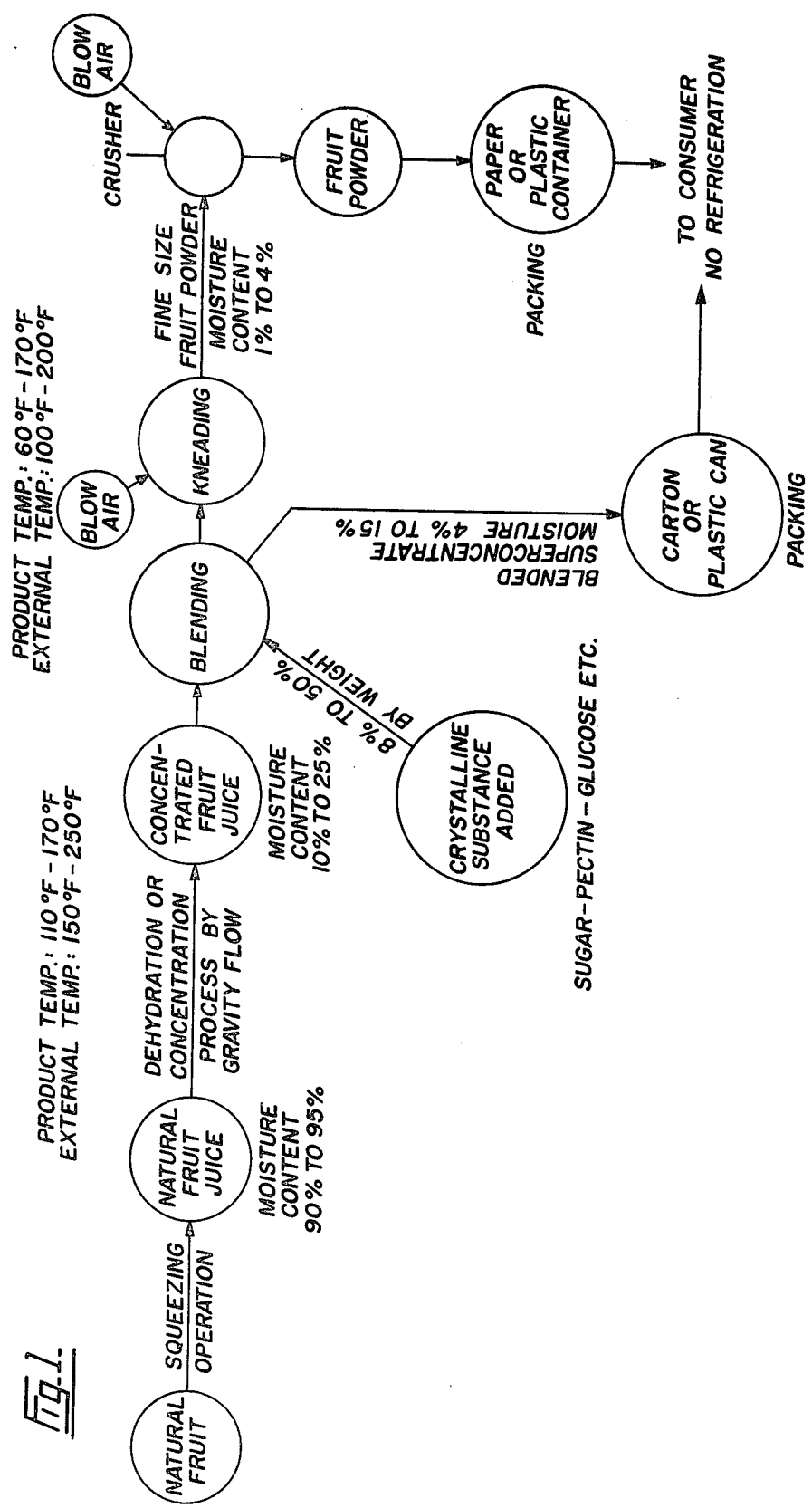

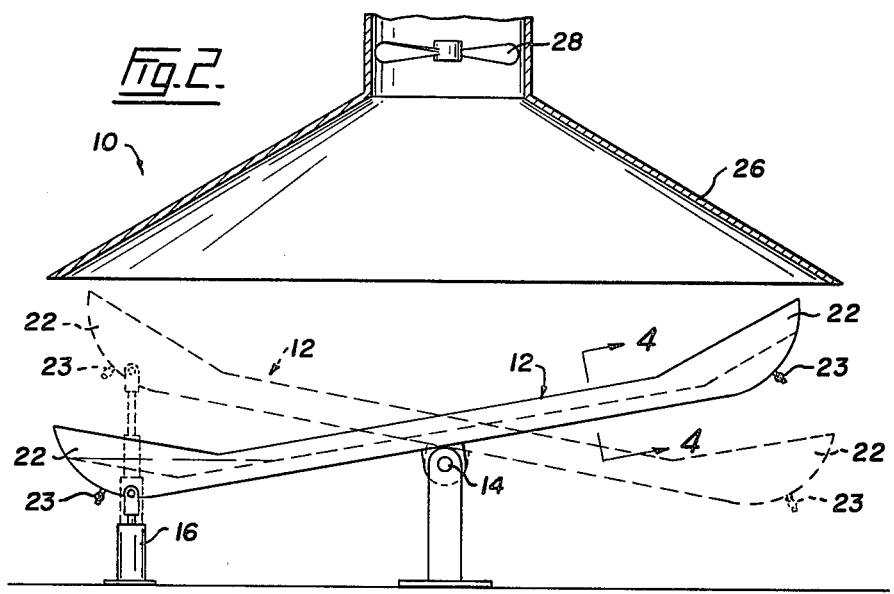
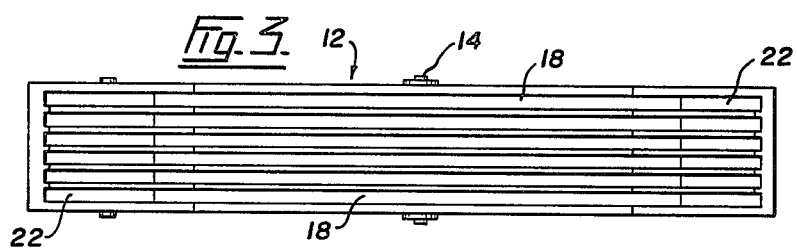
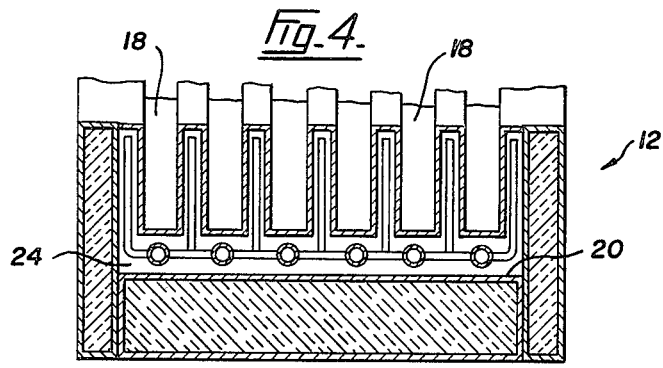

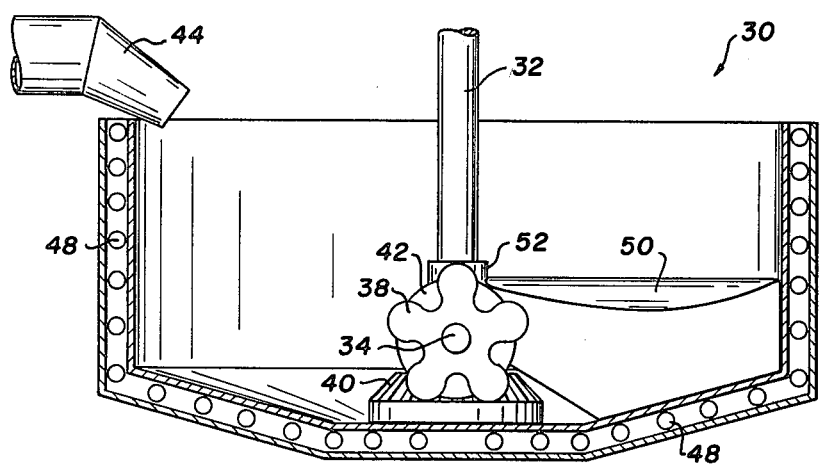
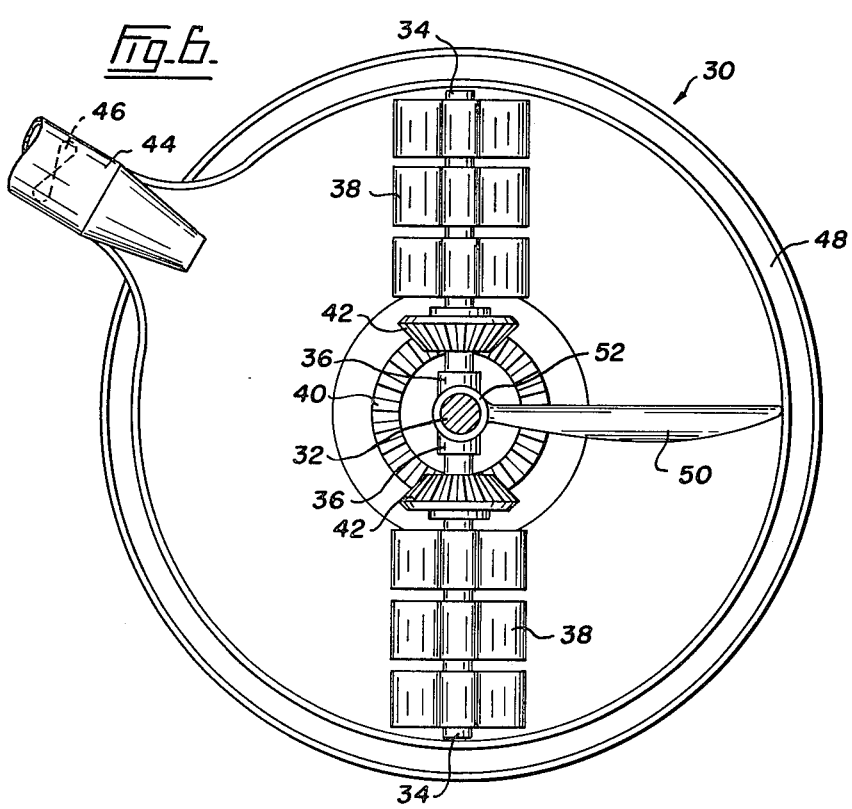

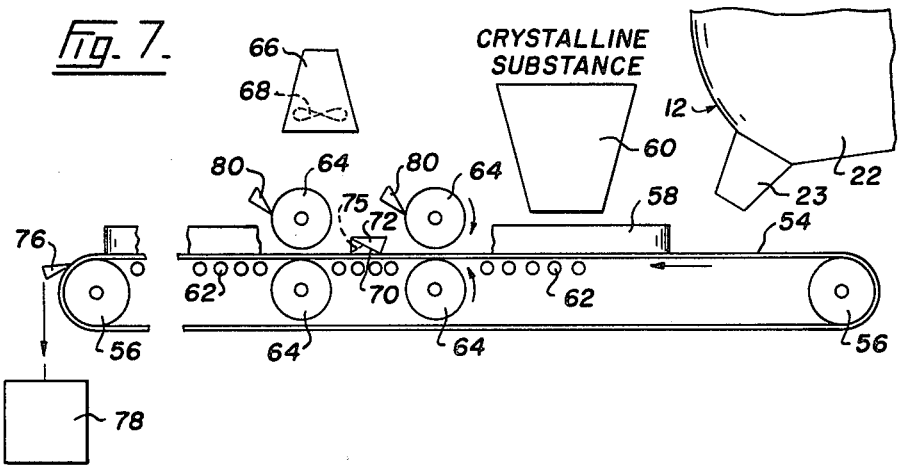
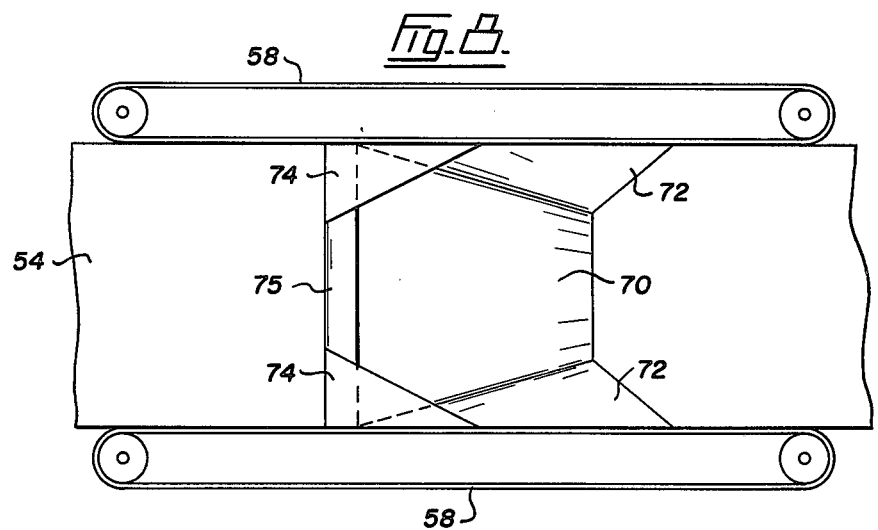

PREPARING FRUIT JUICE POWDER

FIELD OF THE INVENTION

This invention relates to a process and apparatus for producing fruit powder from natural fruit juice, particularly the juice of fruits low in fibre.

DESCRIPTION OF THE PRIOR ART

Fruit juice is widely available commercially. The natural product is available either in sealed cans or a frozen solid. The most common arrangement is to concentrate the juice to remove about 75% of the moisture and then freeze the concentrated juice in a container. In order to obtain the drinkable product water is added by the consumer.

These frozen juices must be kept at low temperature at all time to avoid deterioration.

As will be appreciated this type of preparation is quite expensive. The process of concentration is expensive but it is also expensive to maintain the juice concentrate refrigerated during transport to retail outlets, in the retail outlets and in the home.

My U.S. Pat. No. 3,120,439, issued Feb. 4th, 1964, relates to a process for preparing a coffee extract. Liquid coffee extract is subjected to a dehydrating action to reduce its moisture content and transform the liquid concentrate into a pasty substance. By advancing the extract by gravity flow along an inclined plane and simultaneously heating the extract to a temperature between about 105° and 250° F. The pasty substance is then subjected to a second dehydrating action to reduce its moisture content to between about 1 and 4% by distributing the pasty substance in the form of layers having a thickness about 0.5 millimeters and cooling the layers to about 14° F. The product is then ground into pulverulent form.

My Canadian Pat. No. 886,517 issued Nov. 23rd, 1971 relates to an apparatus and process for drying food in which the temperature of the food is raised to approximately 100° F. and superheated steam is then fed to the product to penetrate the product to affect enlargement of its cellular structure. Hot air is then fed alternately with steam to evaporate water and reduce the moisture content of the product. The superheated steam is uniformly brought into contact with the product for a period between 10 to 30 seconds to penetrate a first layer of the pieces of the food product that are treated. Steam application raises the temperature of the layer to at least 212° F. This enlarges the celluar structure of the product in a nonviolent manner and reduces the moisture content. The flow of steam is shut off and the mass is then subjected to a flow of hot air at a temperature between 300° and 350° F. The hot air is applied for a time sufficient to remove the moisture from the product that has been treated by the steam. That Canadian Patent also describes an apparatus for dehydrating a food product generally comprising a jacketed container with a conical bottom wall and an open top. A series of perforate pipes project upwards in the container and a food product carrying basket is supported on the perforate pipes. Steam and hot air can be fed to the perforated pipes and there are valve means for alternately controlling the feed of steam and hot air to the pipes. Condensate can be drained from the bottom of the container and hot air and steam from the food product in the basket can also be removed from the container.

A Supplementary Disclosure to my above Canadian patent describes a process in which the original dehydration process is not carried to completion but is stopped when the moisture content is between 10 and 50%. Additional crystalline ingredients are then added in an amount of about 25% to 50% of the fruit after cleaning but before steaming. A thorough mixing of the two components is then carried out.

Both the above patents produce excellent products but involve relatively complicated apparatus. In particular the apparatus described in the U.S. Patent is both fairly complicated and demanding of space. The process and apparatus of the Canadian Patent has the disadvantage that they require superheated steam, which can be a difficult material to use and contain. The process of the above Supplementary Disclosure acts, like the process of the Principal Disclosure, on fruit pieces so the product tends to be high in fibre and thus cloudy even after dilution.

SUMMARY OF THE INVENTION

The present invention seeks to produce a simple, quick process and an apparatus for producing a product, that, in tests, carried out was rated better than a number of well known products presently commercially available. The invention provides an apparatus and a method for producing fruit powders containing only dehydrated fruit juice in combination with certain crystalline substances, for example sugars or pectin. It is particularly important that the product according to the present invention can be packaged and stored without refrigeration either in paper of plastic pouches.

Thus, in a first aspect, the present invention is a process for producing a fruit preparation from a natural fruit juice, the process comprising the steps: removing water from the juice by flowing the juice on a heated, reciprocable, inclinable surface to reduce the water content to 10 to 25% by volume; adding a crystalline modifying agents to the product and blending said modifying agent and said product while heating them; and continuing said heating and blending until the water content of said product is in the range of 1 to 15% by volume.

In a particularly desirable aspect the present invention provides a continuous process and the blending is carried out on a heated conveyor belt adapted to feed the modifying agent and product over an inclined surface extending upwardly from the belt. Walls converge inwardly at the upwardly inclined portion of the inclined surface to force the mixture inwardly to assist blending. If necessary the mixture can also be kneaded by passing it between co-operating rollers positioned on each side of the belt. Kneading then takes place as the mixture passes between the rollers.

In a further aspect the present invention is an apparatus for producing a fruit preparation from fruit juice the improvement comprising: (a) a concentrator comprising a first vessel; a pivotable mount at about the center of said first vessel; means to raise and lower an end of the first vessel to reciprocate the first vessel about the pivotable mount; means to heat the first vessel; a closable outlet at each end of the vessel; (b) extraction means for vapour produced from the fruit juice heated in said first vessel; blender means to blend the material produced on the concentrator with an added material.

The invention also provides a fruit preparation prepared by evaporation of a natural fruit juice as a thin film and having a moisture content in the range 1 to 15% and a content of a crystalline material sufficient to enable solidification of the preparation.

BRIEF DESCRIPTION OF DRAWINGS

The invention is illustrated, by way of example, in the accompanying drawings in which:

FIG. 1 is a flow diagram illustrating a process according to the present invention;

FIG. 2 illustrates a part of the apparatus according to the present invention;

FIG. 3 is a plan view of part of the apparatus of FIG. 2;

FIG. 4 is a section along the line 4—4 in FIG. 2;

FIG. 5 is a section through another part of the apparatus according to the present invention; and FIG. 6 is a plan view of the apparatus of FIG. 5.

FIGS. 7 and 8 illustrate diagrammatically an apparatus according to the invention.

DESCRIPTION OF THE PREFERRED EMBODIMENTS

Referring to the drawings FIG. 1 illustrates the carrying out of the process of the present invention with certain additional steps whereby the fruit can be taken from the natural fruit stage right through to the packaged, commercial form. In the process natural fruit juice of fruits low in fibers, for example oranges, grapefruits, lemons, limes, apples, grapes and pineapples, is squeezed to produce the natural fruit juice. Typically, the moisture content of that juice is in the range 90 to 95%. The natural fruit juice is dehydrated, using apparatus described in more detail below, to a moisture content of between 10 and 25%. This concentrated fruit juice may then be treated in the apparatus illustrated in FIGS. 5 to 8 depending on the required product. Various crystalline substances are added to it. Air is blown while a blending operation is carried out to produce a coarse fruit powder. Kneading may be carried out. Generally speaking the temperature of the product is kept in the range 60° F. to 170° F. by heating the vessel in which it is blended, for example to a temperature of 100° F. to 200° F.

The product from the blending operating may be stored in a carton or plastic container. It has a moisture content typically in the range of 4 to 15% and is a semi-solid material. It can be described as a superconcentrate and can be reconstituted to produce a juice distinguishable from the original juice by adding to it about 4 times its own volume of water.

Alternatively, the superconcentrate can be passed to a kneading where air is blown in to it as it is kneaded. This produces a drier material having a moisture content in the range 1 to 4%. The blending, kneading and air blow can all be simultaneously performed in the vessel of FIGS. 5 and 6.

This product can be crushed while subjected to an air blow. The product is a fruit preparation having a moisture content in the range of 1 to 4% and with a fine crystalline form. This product may also be packaged for use by the consumer. Again it does not require refrigeration. Like the superconcentrate it can be reconstituted to produce a juice indistinguishable in clarity from the original fruit juice by adding a minimum of 4 times its own volume of water. In this regard it should be pointed out that existing commercial frozen juices requires 3 times the volume of water to be added, that is the material produced according to the present invention is more economical in use.

A particularly preferred process is a continuous process for production of the superconcentrate. However it can be desirable to use a batch apparatus in about 2 hour cycles. One cycle produces the product with 4 to 15% moisture, the other cycle produces the product with 1 to 4% moisture. Obviously, the relative length of each cycle can be varied to reflect production requirements.

FIG. 2 illustrates schematically an apparatus whereby the natural fruit juice is concentrated by gravity flow. The apparatus is a concentrator generally indicated as 10. The concentrator 10 comprises a first vessel 12 having a pivotal mount 14 at about its center. There are means to raise and lower an end of the vessel to reciprocate the vessel 12 about the pivotal mount 14. In the illustrated embodiment that means comprises a telescopic cylinder 16 which may be hydraulically or pneumatically controlled. The vessel 12 is elongate with channels 18 extending from its base 20 to receive the fruit juice—see FIG. 4. There are reservoirs 22 formed at each end of the vessel 12 and the juice being concentrated congregates in reservoirs 22 when the end of the vessel at which a particular reservoir is positioned is lowered. Each reservoir 22 has a valved outlet 23. Immediately upon filling the reservoir 22 the telescopic cylinder 16 is raised and the juice then flows in the direction of the other reservoir 22.

There are means to heat the first vessel which, as shown in FIG. 4, may comprise internal channels 24 so that steam may be blown through channels 24. Alternatively, electrical heating elements may be positioned in the channels 24. The arrangement is such that the vessel 12 should be heated to a temperature in the range of 150° to 250° F. in order to maintain the product temperature in the range of 110° F. to 170° F. Vapour produced in the heating of the fruit juice in the vessel 12 is extracted by the use of a hood 26 having an exhaust fan 28 positioned in it.

The apparatus of FIGS. 2 to 4 is an extremely effective evaporator. The fruit juice to be concentrated is placed in the vessel 12 which is heated to the above temperature range. The vessel 12 is tipped by use of the telescopic cylinder 16 and the juice runs to the lower end as a relatively thin film so that extremely effective heat transfer is achieved. When all the juice is in the lower reservoir 22 the telescopic cylinder 16 is again operated to make the juice run down to the other end of the vessel 12, again passing over heated surfaces as it flows in the channels 18.

It is particularly important to note that the water content of the juice is rapidly evaporated from a thin film of juice as the juice flows back and forth in the vessel 12. The juice never boils so that the natural ingredients of the juice are not destroyed by being subjected to excessive heat.

In a batch process the product from the apparatus of FIGS. 2 to 4 is fed to a blending apparatus. That apparatus is illustrated particularly in FIGS. 5 and 6. However, the apparatus of FIGS. 2 to 4 also includes kneading means. The apparatus comprises a second vessel 30 to receive material from the concentrator 10. There is a shaft 32 substantially coaxial with the vessel 30. There are drive means for the shaft 32 (not shown) in the form of, for example, an electric motor. When the apparatus is to be used for kneading, for example in the production of a powder as distinct from the superconcentrate, an arm 34 is rotated by the shaft 32 in a substantially radial plane of the vessel 30. The arm 34 is in two parts each attached to the shaft 32 by a bearing 36. Arm 34 may be removed. Each part of arm 34 can rotate within the bearing 36. There are a plurality of kneader heads 38 mounted on the arm 34. A gear wheel 40 is mounted on the shaft 32 and meshes with pinions 42 on each part of arm 34. The arrangement is such that the arm 34 rotates in a substantially radial plane of the vessel 30 and, at the same time, the kneader heads 38 rotate in a direction perpendicular to the plane. Each part of arm 34 may extend upwardly outwardly to avoid hitting the inclined base of the vessel 30.

There is a duct 44 whereby air may be blown into the vessel 30 again when the powder is required. As indicated particularly in FIG. 6 a fan 46 may be used to blow the air. There are heating elements 48 positioned in the walls of the vessel 30.

The vessel 30 also has means to blend material in the vessel comprising an arm 50 shaped to conform to the base of the vessel 30 and mounted to rotate with the shaft 32 by a bearing 52.

FIGS. 7 and 8 illustrate diagrammatically an apparatus and a continuous process according to the present invention. As indicated generally in FIG. 7 material from a reservoir 22 is fed out through valve outlet 23. Although not shown in FIG. 7 it is desirable that there be a plurality of concentrators 12 all feeding to one conveyor belt 54. The conveyor belt 54 has drive rollers 56. As particularly shown in FIG. 8 there are containing conveyor belts 58 running alongside the main conveyor belt 54 to ensure that the material remains in position on the main belt 54.

In this embodiment crystalline substance is fed from a hopper 60 onto the belt. There are heating means in the form of pipes 62 positioned beneath the belt 54. FIG. 7 shows an embodiment in which there are kneading rollers 64 positioned in pairs above and below the belt 54. The material is kneaded as it passes between those rollers 64. FIG. 7 also illustrates an air blow system 66 positioned generally above the belt including a fan 68. However, like the kneading rollers 64 this use of the fan 68 is not essential.

The main components on the conveyor belt 54 are inclined surfaces 70 indicated generally at FIG. 7 but shown in more detail in FIG. 8. The material is moved along the belt 54 and passes on a surface 70 inclined upwardly. There are side surfaces 72 also inclined upwardly and extending from the main surface 70. There are further upstanding portions 74 at the ends of the inclined surfaces 70 and a downwardly inclined surface 75. The arrangement of this plurality of inclined surfaces 70, 72, 74 and 75 is such that the material passes from the belt 54 onto the main surface 70 where it is blended by the surface 72 tending to turn over the material at the side of the surface 70 back into the center and by the narrowing affect of the upstanding portions 74. The material is forced over the end of the inclined surface 70 to return to the belt 54 down inclined surface 75, also assisting in the blending.

There is a doctor knife 76 at the end of the belt 54 so that the material, now well blended, is removed from the belt 54 and fed to a container 78. The upper rollers of the pairs of rollers 64 are also provided with doctor knifes 80 to clean the material from the upper rollers.

The device of FIG. 7 is useful in producing a powder, that is the material with a lower water content, but without the use of the pairs of rollers 64 and without the use of the air blow system 68, for example, as shown in FIG. 8, the system is desirable in producting the super-concentrate. Production is continuous because of the use of the conveyor belt.

The embodiment of FIG. 7 can use as many pairs of rollers 64 as are found to be desirable to produce a product having a water content in the range 1 to 4%. Generally speaking the apparatus of FIG. 8 does not have a dehydrating effect, principally because of the absence of an air blow. In each case the product is packaged as indicated above and can be transported to the consumer without refrigeration.

Using the apparatus and process of the present invention a product may be obtained that, upon dilution with at least 4 times its own volume of water, may be considered indistinguishable from the natural juice in clarity. In consumer tests conducted the product was rated higher than a cross section of widely advertised and widely sold commercial products. It is believed that one reason for this high quality is the concentrator. The arrangement of the concentrator is such that the fruit juice is evaporated as a thin film and is never subjected to high temperatures such as would destroy, for example, vitamins in the original product. That is these vitamins and other nutrients come through the process unaltered, which has not been possible in prior art processes.

I claim:

1. A process for producing a fruit preparation from a natural fruit juice, the process comprising the steps:
   removing water from the juice by flowing the juice in a thin film on a heated, reciprocable, inclinable surface to reduce the water content to 10 to 25% by volume to produce a first product;
   adding a crystalline modifying agent selected from the group consisting of sugars or pectin in a quantity sufficient to enable solidification of the preparation, to the first product and blending said modifying agent and said first product while heating them by blowing air on them to produce a second product; and
   continuing said heating and blending until the water content of said second product is in the range of 1 to 15% by volume to produce said fruit preparation.

2. A process as claimed in claim 1 including continuing the heating and blending until the moisture content is in the range of 4 to 15%.

3. A process as claimed in claim 1 including kneading the modifying agent and the first product simultaneously with the blending, and blowing in air during the kneading and blending to produce a fruit preparation having a moisture content in the range 1 to 4%.

4. A process as claimed in claim 3 including crushing the fruit preparation having a moisture content in the range of 1 to 4% and blowing air into the crushing process to produce a powder.

5. A process as claimed in claim 1 in the form of a continuous process, said blending being carried out on a heated conveyor belt adapted to feed said modifying agent and first product over an inclined surface extending upwardly from said belt, walls converging inwardly at the upwardly inclined portion of the inclined surface to force the mixture inwardly to assist blending.

6. A process as claimed in claim 5 including passing the mixture between co-operating rollers positioned on each side of the belt to knead the mixture as it passes between them.

7. A process as claimed in claim 5 including passing the mixture over a plurality of inclined surfaces, each spaced from the other.

8. A process as claimed in claim 7 including passing the mixture between a plurality of co-operating pairs of rollers, each co-operating pair positioned between two inclined surfaces.

* * * * *